United States Patent [19]

Saiki et al.

[11] Patent Number: 4,577,141

[45] Date of Patent: Mar. 18, 1986

[54] SYSTEM FOR DRIVING A MOVABLE STAGE

[75] Inventors: Kazuaki Saiki, Kawasaki; Aiichi Ishikawa, Minami-ashigara; Noriyoshi Hashimoto; Koichi Kudo, both of Yokohama; Kuniyuki Yoshikawa, Fujisawa, all of Japan

[73] Assignee: Nippon Kogaku K.K., Tokyo, Japan

[21] Appl. No.: 675,323

[22] Filed: Nov. 27, 1984

[30] Foreign Application Priority Data

Nov. 30, 1983 [JP] Japan .................................. 58-226344
Nov. 30, 1983 [JP] Japan .................................. 58-226346

[51] Int. Cl.⁴ .......................................... G05B 11/18
[52] U.S. Cl. .................................... 318/590; 318/603; 364/190
[58] Field of Search ............... 318/561, 590, 592, 594, 318/640, 624, 628, 603, 601, 599, 632; 340/709; 200/6 A, 6 R; 350/511, 519, 530, 531; 364/190

Primary Examiner—William M. Shoop, Jr.
Assistant Examiner—Patrick C. Keane
Attorney, Agent, or Firm—Shapiro and Shapiro

[57] ABSTRACT

In order to appropriately position a specimen within a view finder of a microscope, the stage supporting the specimen must be quickly and smoothly moved in all directions of two dimensions X and Y. According to the present invention, this can be accomplished by dividing a tilt angle of an operation lever of a joy stick into three regions, an insensitive band, a low velocity region and a high velocity region. For each of latter two regions, a relevant signal is produced by the joy stick and transferred to a microcomputer which controls stage driving motors by sawtooth pulse voltages. The velocities of X- and Y-stages are generally setted in the microcomputer so as to be high for the high speed region and low for the low speed regions, and movements in X- and Y-directions alternate by a short time interval, thus quick and smooth movements of stages being enabled.

10 Claims, 8 Drawing Figures

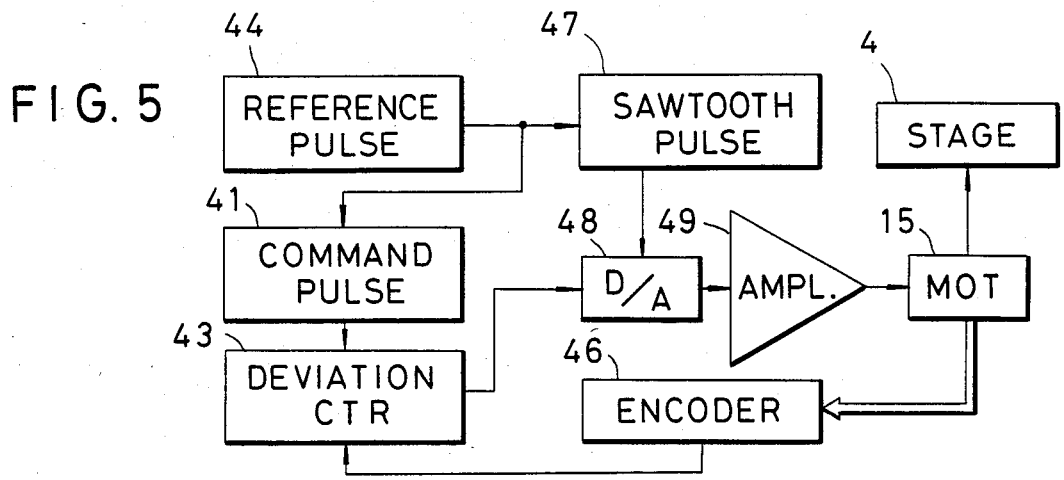
FIG. 5
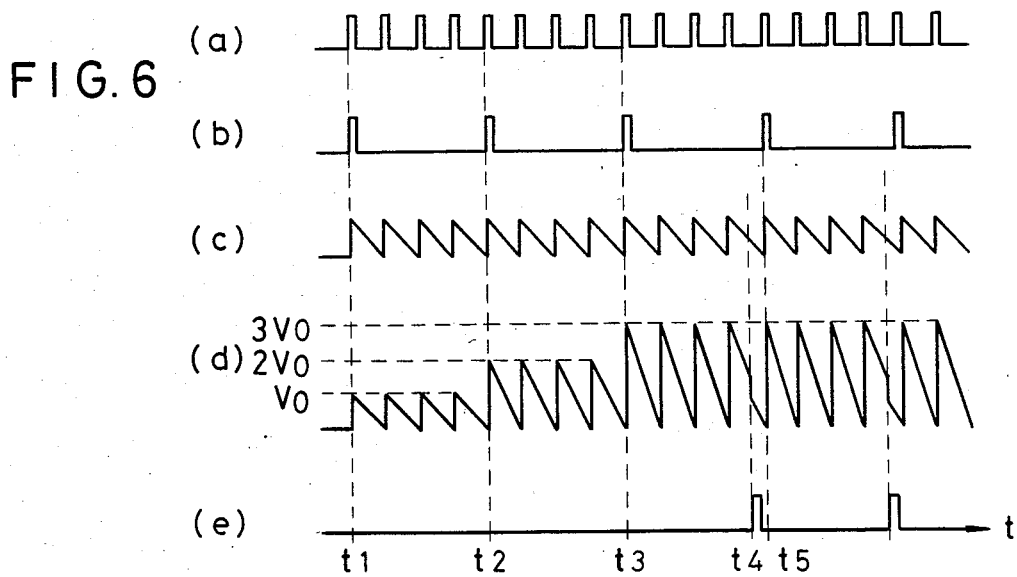
FIG. 6
FIG. 7A
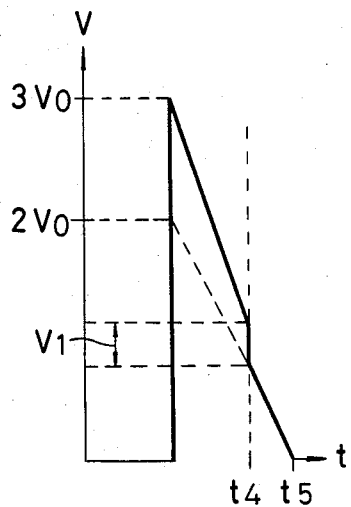
FIG. 7B
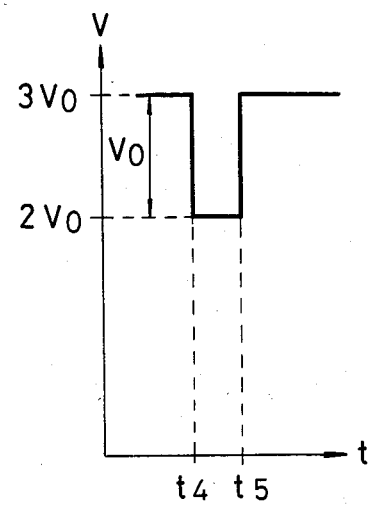

SYSTEM FOR DRIVING A MOVABLE STAGE

BACKGROUND OF THE INVENTION

1. Field of the Invention

The present invention relates to a stage driving system for controlling a movable stage by the use of a joy stick, for example, such as an X-Y stage driving system in which X- and Y-direction stages can electrically be driven by X- and Y-direction motors, respectively.

2. Description of the Prior Art

There is known a joy stick including an operation lever tiltable in all the directions. Such a joy stick can generate electric output signals corresponding to X- and Y-direction components of a certain direction in which the operation lever is tilted from its neutral position. Upon release, the operation lever will be returned to the neutral position.

The joy stick may be used in an X-Y stage of such a triple-layered structure that a base member carries a Y-direction drive such as a motor, a Y-direction lead screw and an encoder for detecting the position of a Y-direction stage from the rotation of the lead screw, the Y-direction stage being slidably mounted on the base member only in the Y-direction and having a frame threadedly connected with the Y-direction lead screw. The Y-direction stage in turn carries X-direction drive similar to the Y-direction drive, the X-direction drive including an X-direction lead screw threadedly connected with the frame of an X-direction stage which is slidably mounted on the Y-direction stage only in the X-direction. In such an arrangement, the X- and Y-direction drive motors can respectively be energized by electric signals corresponding to the respective X- and Y-direction components obtained from the joy stick.

Systems for controlling the motions of X- and Y-direction stages by the use of a joy stick operation lever are commercially available.

In the prior art systems, the stages cannot satisfactorily be controlled from lower speed to higher speed through the range of lever inclination even if the operation lever is to be tilted from its neutral position under the proportional or exponential relationship, since the magnitude of electric signals depends on the angle of the tilted operation lever.

SUMMARY OF THE INVENTION

It is therefore an object of the present invention to provide a stage driving system for controlling the movement of stage means through a joy stick with an improved operability.

To accomplish the above object, the present invention provides a stage driving system comprising a joy stick having an operation lever tiltable from its neutral position in all the directions and being adapted to generate output signals depending on the direction and angle of the tilted operation lever, the inclination of the operation lever being divided into a fine-adjustment region between first and second angles relative to the neutral position and a high-speed region between second and third angles relative to the neutral position, the joy stick being so designed that it generates a first output signal variable only in a predetermined relationship with the angle of inclination in the fine-adjustment region of the operation lever and produces a second output signal variable to a predetermined value with a predetermined acceleration irrespective of the angle of inclination in the high-speed region of the operation lever, the first and second output signals being used to control a stage driving motor.

In accordance with another feature of the present invention, the stage driving motor is supplied with a drive voltage which is controlled by sawtooth pulses.

BRIEF DESCRIPTION OF THE DRAWINGS

FIG. 5 is a block diagram of a motor control circuit in accordance with the present invention;

FIG. 6 is a time chart of the motor control circuit shown in FIG. 5;

FIG. 7A is a partially enlarged view of the time chart shown in FIG. 6; and

FIG. 7B is a view illustrating the function of the motor control circuit in accordance with the present invention.

DETAILED DESCRIPTION OF THE PREFERRED EMBODIMENTS

Figure 1:
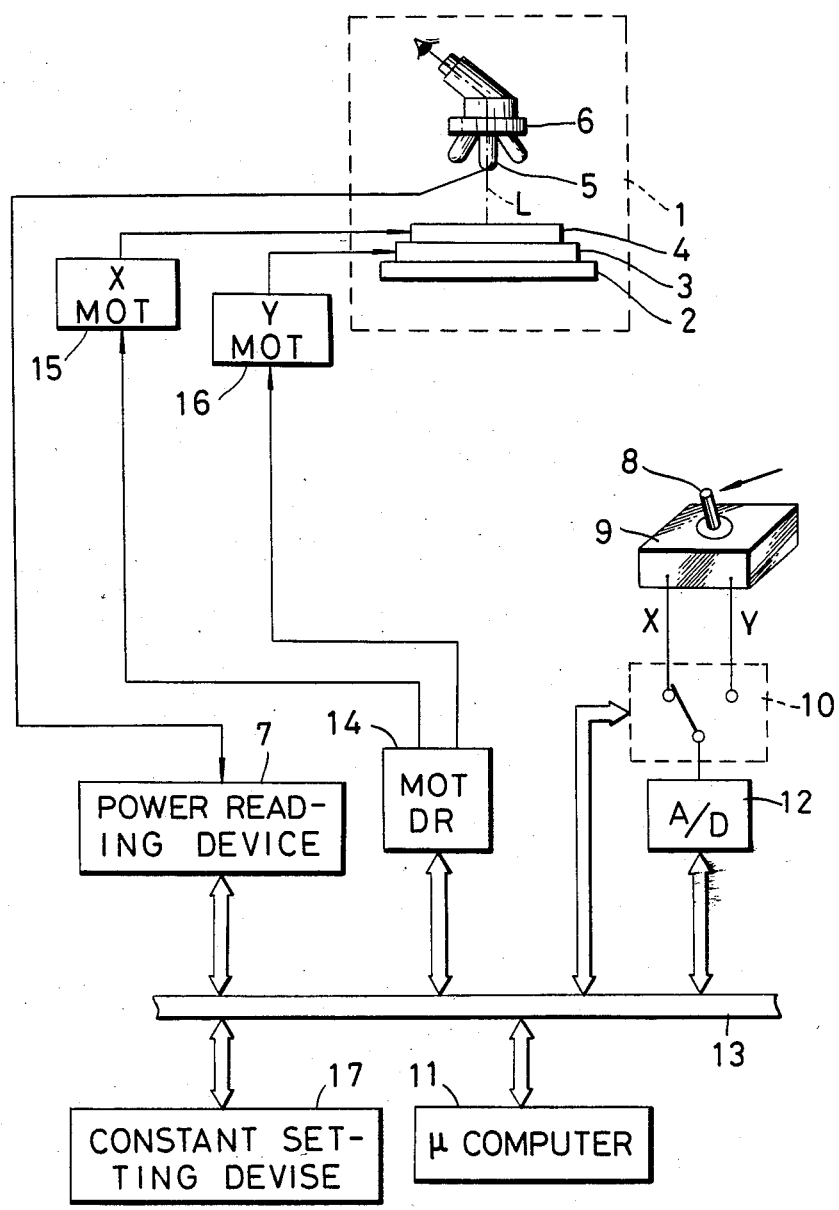
FIG. 1 is a block diagram of one embodiment of the present invention.

Referring now to FIG. 1, there is shown a microscope body 1 including a base member 2, a Y-direction stage 3 movable relative to the base member 2 in the Y-direction, and an X-direction stage 4 movable relative to the Y-direction stage 3 in the X-direction. The microscope body 1 further includes a revolver 6 and a plurality of objectives 5 mounted thereon. When one of the objectives is placed in the optical axis L for observation, its magnification can be read by a known power reading device 7.

A joy stick 9 includes an operation lever 8 tiltable from its neutral position in all the directions and also has an X-direction potentiometer, a Y-direction potentiometer, and so on. The joy stick 9 further includes terminals X and Y at which there are respectively generated X- and Y-output signals corresponding to X- and Y-direction components in the direction of the tilted operation lever 8. These X- and Y-direction components may be designated by components when operation lever 8 is projected onto a plane perpendicular to the operation lever 8 in its neutral position. The X- and Y-terminals are changed from one to another depending on signals from the microcomputer 11 when an input signal changing device 10 is actuated. Signals from the input signal changing device 10 are converted into digital signals through an A/D converter 12 and thereafter stored in the memory of the microcomputer 11 through a 8-bit bus 13. The memory of the microcomputer 11 also receives signals from the power reading device 17 through the 8-bit bus 13. Control output signals from the microcomputer 11 is supplied to a motor driving circuit 14 which in turn generates output signals used to control X- and Y-direction motors 15 and 16.

The operation described in connection with FIG. 1 will now be described in more detail with reference to FIG. 2 which shows a flow chart of the microcomputer 11.

When a stage drive mode is set by the use of a mode setting switch means (not shown) or the like at Step 20, the microcomputer 11 is shifted to select the terminal X of the input signal changing device 10 at Step 21. At Step 22, then, the power reading device 7 is actuated to read the magnification of an objective which is now placed in the optical path. At Step 23, X-component signal from the joy stick, that is, X-direction component of the operation lever 8 is read from the contents of the A/D converter 12. Assuming that the read value is equal to P, this value P is compared with a reference value R at Step 24. It is discriminated whether the value belongs to a proportional region A or to an acceleration region B. If to the proportional region A, a velocity $v_p$ corresponding to a proportional velocity line determined by the magnification as shown in FIG. 3 is read at Step 25.

Figure 3:
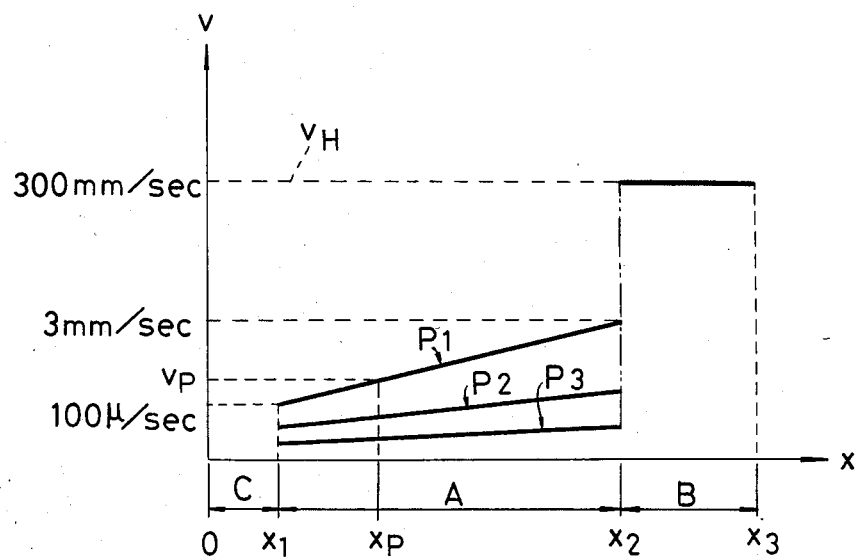
FIG. 3 is a graph showing the relationship between X-direction components of the tilted operation lever and the velocity of X-direction stage with respect to magnifications of an objective as parameters.

In the graph shown in FIG. 3, the axis of abscissa (x) represents X-direction components of the operation lever 8 while the axis of ordinates (v) represents velocities (v) of the X-direction stage 4 being moved. Straight lines $P_1$, $P_2$ and $P_3$ show magnifications of objectives increased in the order described herein. For example, the straight line $P_1$ denotes 100 times magnification, the straight line $P_2$ 200 times magnification and the straight line $P_3$ 400 times magnification. When X-component is at $x_1$, velocities represented by the straight lines $P_1$, $P_2$ and $P_3$ are predetermined velocities different from each other and not equal to zero, which are respectively suitable for the magnifications corresponding to the straight lines $P_1$, $P_2$ and $P_3$. For example, at 100 times magnification, a velocity corresponding to $x_1$ is equal to 100 $\mu$/sec. and a velocity corresponding to $x_2$ is equal to 3 mm/sec.

Referring further to FIG. 3, X-components between zero and $x_1$ belong to an insensitive band C, X-components between $x_1$ and $x_2$ belong to the proportional velocity region (low velocity region) A, and X-components between $x_2$ and $x_3$ belong to the acceleration region (high velocity region) B. The value $x_2$ corresponds to the reference value R at Step 24. The relationship between the X-direction components dependent on the angle of the tilted operation lever 8 and the velocities of the X-direction stage is stored in the memory circuit (ROM) in the microcomputer 11 so that they are available therein.

For example, assuming that a magnification corresponding to the straight line $P_1$ is read at Step 22 and that X-signal of the A/D converter 12 read at Step 23 is equal to a value corresponding to X-direction component $x_p$, the velocity of the X-direction stage 4 is equal to $v_p$. At Step 26, assuming that the present velocity of the stage 4 in the X-direction is equal to v and the maximum velocity of the same in the region A corresponding to the magnification read at Step 22 is equal to $v_L$, these values v and $v_L$ are compared with each other for discriminating whether or not the X-direction stage 4 should be reduced in velocity. Because the X-direction stage 4 has been stopped, the reduction of velocity is not required now. Therefore, at Step 27, velocity $v_p$ is set such that the X-direction stage 4 can be driven along the straight line $P_1$ in FIG. 3, that is, at the velocity $v_p$ corresponding to X-direction component $x_p$. Further, at Step 32, the microcomputer 11 provides a control signal to the motor drive control circuit 14. After 20 msec. the microcomputer 11 is changed to the Y-terminal and the program for Y-direction proceeds sequentially to Step 22, Step 23 and Step 24 as in the X-direction program.

Thus, the microcomputer 11 provides a control signal to the motor drive control circuit 14 to control the Y-direction stage 3 in accordance with the proportional velocity line as in FIG. 3. Further, the program proceeds through Steps 25 and 27 to Steps 32, 33 and 34 at which the input signal changing device 10 is again changed to the X-terminal. In such a manner, the microcomputer 11 operates to update the controlled velocity v in X- or Y-axis drive circuit at each predetermined time, for example, for each 20 msec.

If the operation lever 8 is sufficiently tilted, the contents of the A/D converter 12 will indicate the acceleration region B at Step 23. At Step 29, it is discriminated whether or not the velocity V of the moving stage 3 reaches the maximum velocity $V_H$. If the velocity V is larger than the maximum velocity $V_H$, the former is decreased to the latter at Step 30. The program then proceeds to Step 32. If the velocity V is smaller than the maximum velocity $V_H$, a predetermined value a is added to the velocity V and then the program proceeds to Step 32. In this manner, the microcomputer 11 operates so as to accelerate the X-direction stage 4 from its initial velocity $v_p$ to the maximum velocity $V_H$ (30 mm/sec. in FIG. 3) under a constant acceleration (Steps 29, 30, 31, 32 and 33).

After 20 msec. (Step 30), the input signal changing device 10 is again changed to the Y-terminal (Step 28). When the input signal changing device 10 is further changed to the X-terminal, the X-direction stage 4 is being accelerated. At this time, if the X-direction component of the operation lever corresponds to the proportional velocity region $x_p$, the microcomputer 11 judges at Step 26 that the X-direction stage should be decelerated at Step 25. Then, at Step 28, the microcomputer 11 progressively varies the control signal by subtracting a given value a' from the present controlled velocity v such that the latter is decreased to the velocity $v_p$ under a constant acceleration.

If the revolver 6 is rotated to set an objective having a proper magnification in the optical path and when the operation lever 8 is tilted toward the desired direction, an operator can observe through the microscope eyepiece that the X-Y stage unit is moved in the direction corresponding to the direction of the tilted lever 8 at a velocity corresponding to the angle of the tilted lever 8 and the magnification of the objective presently set in the optical path. If the X-Y stage unit is still remote from the target position, the operation lever 8 may further be tilted beyond a predetermined angle (for example, 25 degrees). Then, the stage unit will be accelerated from an initial velocity equal to the velocity before the lever 8 is further tilted to the maximum velocity in the direction in which the lever 8 is tilted. If the tilted angle of the operation lever 8 is decreased from the time acceleration region to the proportional velocity region, the stage unit can smoothly be decelerated without any abrupt deceleration.

If the operation lever 8 is released when the goal position appears at a predetermined position in the field of view, the lever 8 is automatically returned to its neutral position and both the output X- and Y-signals from the A/D converter 12 become equal to zero. Then, the microcomputer 11 applies a control signal to the motor drive circuit 14 such that both the X- and Y-direction motors 15 and 16 will be braked to instantaneously stop the X-Y stage unit.

Figure 2:
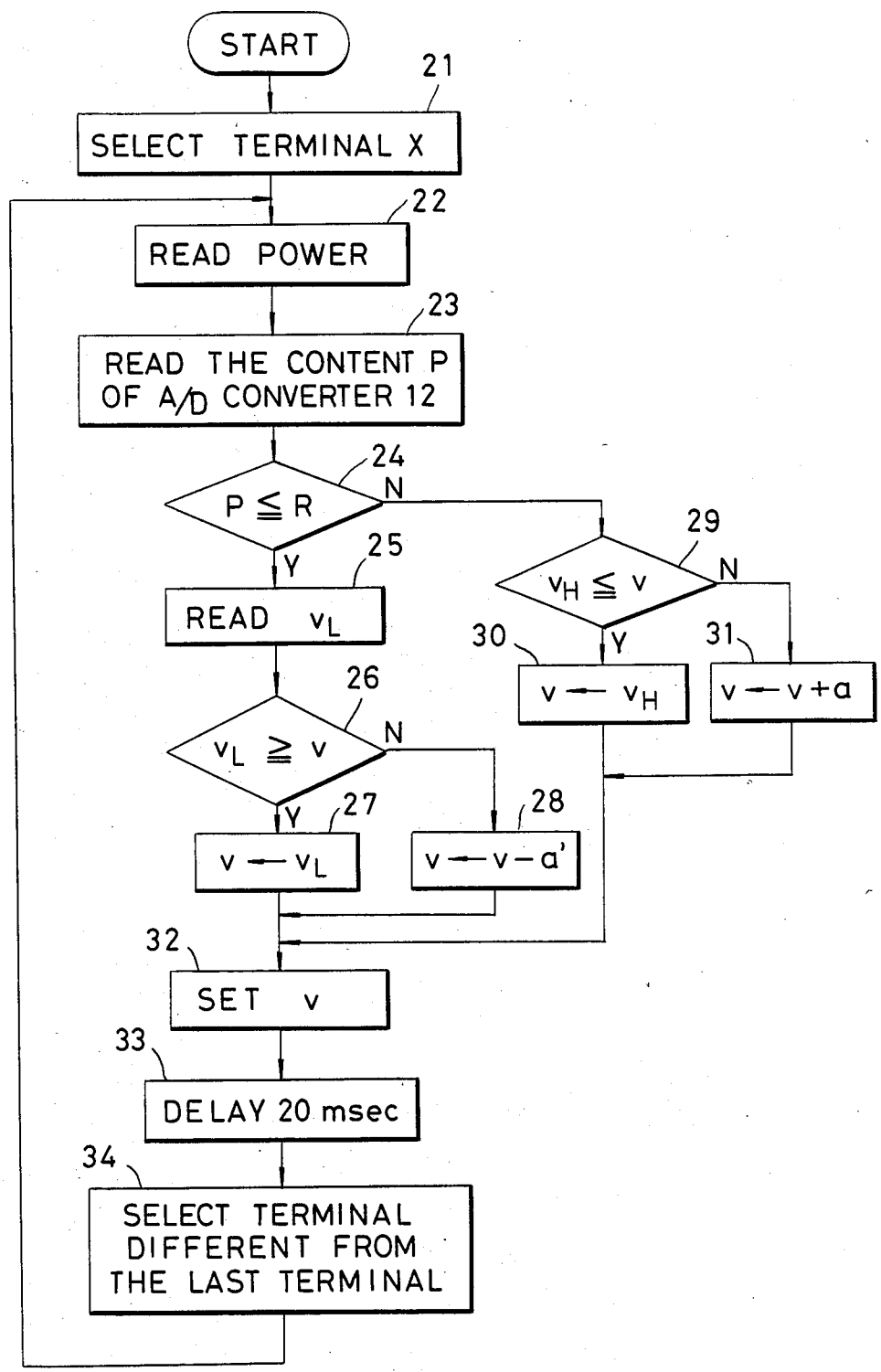
FIG. 2 is a flow chart of a microcomputer shown in FIG. 1.

The flow chart of the microcomputer 11 shown in FIG. 2 may be modified into various configurations. It is, however, important that the inclination of the operation lever is divided into three regions, a first region between the neutral position and a first angle, a second region between the first angle and a second angle and a third region between the second angle and a third angle. The first region is an insensitive band through which the stage unit will not be moved. The second region is one through which the velocity is changed only in a predetermined relationship with the angle of inclination such that a fine adjustment can be carried out for the stage unit. The third region is one through which the stage unit can be accelerated to a predetermined velocity. For example, the velocity in the second region may be changed in accordance with a curved line rather than such straight lines as shown in FIG. 3. However, such a change must not be too drastic since the fine adjustment would be impossible. Furthermore, a stepped change is undesirable since the stage unit will not smoothly be moved.

Velocities represented by the straight lines $P_1$, $P_2$ and $P_3$ corresponding to x in FIG. 3 are so determined that the stage 4 can pass through an area observed through the microscope viewfinder for the same time period irrespective of the magnification of the objectives.

Figure 4:
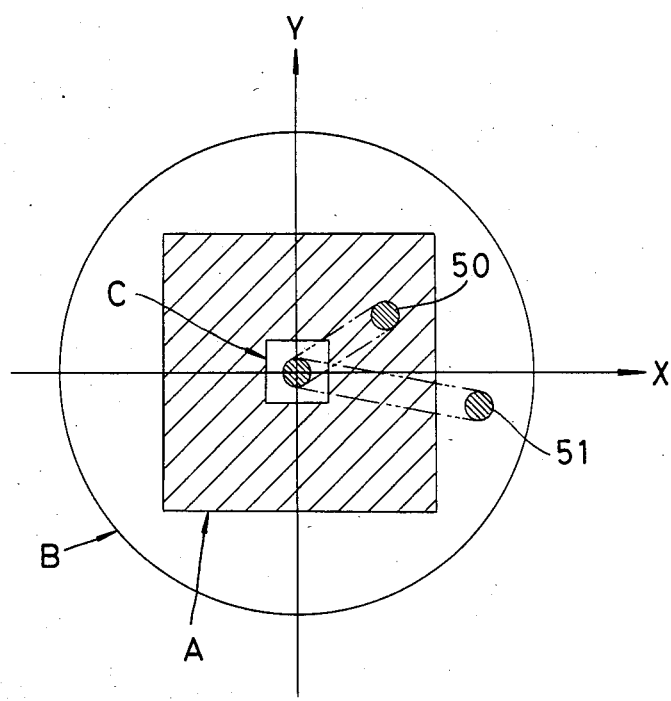
FIG. 4 is a schematic view of the joy stick as viewed from its top.

Referring now to FIG. 4, it is assumed that regions A, B and C correspond to the three regions described hereinbefore in connection with FIG. 3. When the operation lever 8 is in a position shown at 50 in FIG. 4, it belongs to the region A. Therefore, the stage unit will be moved at a composite velocity of the X- and Y-direction stages 4, 3 which is determined in such a relationship as shown in FIG. 3. If the operation lever 8 is in a position shown at 51 in FIG. 4, it belongs to the acceleration region B. Therefore, the X- and Y-direction stages 4, 3 will be accelerated to the respective maximum velocities. If the accelerations and maximum velocities at this time are changed depending on components $x_2$ and $Y_2$, "feel" in operation can be improved.

If the microcomputer 11 can correct its stored values (for example, addition and subtraction of constant) by the use of a constant setting device shown at 17 in FIG. 1 such that constants can continuously or stepwise be inputted to for example, to shift the straight lines $P_1$, $P_2$ and $P_3$ shown in FIG. 3 simultaneously or independently along the axis of ordinates, the joy stick can be modified to be compatible with the operator's "feel". It is also of course that the straight lines may be tilted through different angles.

FIG. 5 shows a block diagram of a circuit for controlling the X-direction motor 15 in the motor drive circuit 17 shown in FIG. 1. This circuit comprises a deviation counter 43 having one input terminal to which command pulses having frequencies corresponding to the velocities of the moving stage 4 are supplied from a command pulse generator 41. The other input terminal of the deviation counter 43 receives feedback pulses from a rotary encoder 46 which includes a rotating shaft connected with that of a DC motor 15 for driving the stage 4. The deviation counter 43 generates digital output signals indicative of counts corresponding to differences between the numbers of the command pulses and feedback pulses. The circuit also comprises a reference pulse generator 44 providing a reference pulse to the command pulse generator 41 and a sawtooth wave generator 47. The reference pulse is divided to provide command pulses. The reference pulse generator 44 is controlled by the microcomputer 11 through the bus 13 such that pulses will be generated therefrom in a cycle corresponding to the velocity of the moving stage 4. On the other hand, the sawtooth wave generator 47 includes, for example, an integrating circuit which converts the output pulses of the reference pulse generator 44 into sawtooth pulses. D/A converter 48 is gain-controlled by the sawtooth pulses from the sawtooth wave generator 47. Therefore, analog output signals from the D/A converter 48 are sawtooth signals obtained from the count of the deviation counter 43 multiplied by the gain control signal. These sawtooth signals are used to control the DC motor 15 through an amplifier 49.

If a reference pulse as shown in FIG. 6(a) is generated on the output of the reference pulse generator 44, the command pulse generator 41 generates at the output a command pulse obtained by dividing the reference pulse into one fourth as shown in FIG. 6(b). As a result, the sawtooth wave generator 47 produces at its output a sawtooth pulse as shown in FIG. 6(c). Consequently, if the command pulse begins to be supplied to the deviation counter 43 at time $t_1$, the count of the deviation counter 43 becomes "one". Correspondingly, the output signal of the D/A converter 48 will be modulated by the sawtooth pulse from the sawtooth wave generator 47 to provide a sawtooth wave signal having the maximum value $V_0$ as shown in FIG. 6(d). This sawtooth signal is supplied to the amplifier 49 at which the signal is changed to a sawtooth drive voltage in turn applied to the DC motor 15. This voltage cannot drive the DC motor 15. Then, if a command pulse is supplied to the deviation counter 43 at time $t_2$, the count becomes "two". Thus, the output signal of the D/A converter 48 is changed to a sawtooth wave signal having the maximum value $2V_0$ (FIG. 6(d)). This signal is converted into a sawtooth drive voltage through the amplifier 49. This voltage also cannot drive the DC motor 15. When a command pulse is inputted at time $t_3$, the count of the deviation counter 43 becomes "three". Thus, the output signal of the D/A converter 48 is changed to a sawtooth signal having the maximum value $3V_0$ (FIG. 6(d)). The maximum value $3V_0$ is sufficient to initiate the rotation of the DC motor 15. If the frequency of the signal in FIG. 6(d) is properly set, the DC motor 15 can smoothly be driven without any increased deceleration even if the drive voltage is sometimes reduced. This is because there is an inertial force in the DC motor 15.

If the DC motor 15 is rotated through a predetermined amount, that is, if the stage 4 is moved through a predetermined distance, the rotary encoder 46 generates a feedback pulse at time $t_4$. As a result, the count of the deviation counter 43 becomes "two" so that the output signal of the D/A converter 48 is changed to a sawtooth wave signal having the maximum $2V_0$. Strictly, the drive voltage to the DC motor 15 is abruptly changed at time $t_4$. However, the DC motor 15 can smoothly be driven because of its inertial force. If a command pulse is again generated at time $t_5$, the count of the deviation counter 43 becomes "three" and then the output signal of the D/A converter 48 is changed to a sawtooth wave signal having the maximum value $3V_0$. Subsequently, similar operation will be repeated.

When the generation of command pulse is stopped, a feedback pulse is supplied to the deviation counter 43 the count of which is decreased from three to zero. Also, the output of the D/A converter 48 is changed from the sawtooth wave signal having the maximum value $3V_0$ to the sawtooth wave signal having the maximum value $V_0$. Correspondingly, the velocity of the DC motor 15 also is reduced and stopped when the output signal of the D/A converter 48 becomes equal to zero.

In such an arrangement, as shown in FIG. 7A, the variation $v_1$ of the output signal from the D/A converter 48 at time $t_4$ can be changed to be sufficiently smaller than the variaton $V_0$ (FIG. 7B) of the output signal of the same in the relationships of FIGS. 6(a), (b) and (e) through the prior art circuit, that is, one which does not have the sawtooth wave generator 47 for changing the gain of the D/A converter 48 to a sawtooth wave as shown in FIG. 1. Therefore, the change of voltage in the DC motor is decreased to provide a smooth movement to the stage.

Each of the aforementioned embodiments utilize an integrating circuit as the sawtooth wave generator 47. Thus, if the frequency of the reference pulse is increased, as seen from FIG. 6(d), one sawtooth wave rises before the preceding sawtooth wave falls to zero, so that the integration of the drive voltage in the DC motor 15 will be increased. Therefore, the DC motor 15 is increased correspondingly in velocity. Also, if the frequency of the command pulse is decreased, as seen from FIG. 6(d), each adjacent sawtooth waves are spaced away from each other so that the rotational velocity of the DC motor 15 will be reduced. In any event, it is required that the range of frequency of the command pulse and the maximum value of the sawtooth wave signal are experimentally determined such that the stage 4 can smoothly be moved actually without obstruction.

A control circuit for the Y-direction motor 16 is constructed and arranged in a manner similar to that of the X-direction motor 15.

It may be considered to control the gain of the amplifier 49 rather than that of the D/A converter 48. It is, however, preferred that sawtooth waves are used as control signals rather than sine waves, triangle waves and others to provide more smooth movement to the stage.

Although the embodiment of FIG. 5 has detected the movement of the stage indirectly through the rotary encoder, it is to be understood that the movement of the stage may be read directly by the use of a linear encoder or the like.

In this connection, the velocity of the moving stage may be maintained constant by holding the cycle of reference pulse at a cycle corresponding to the desired velocity of the stage. As shown at Step 31 in FIG. 2, when the stage is to be moved under a predetermined acceleration, the cycle of reference may be increased to add a predetermined velocity at each predetermined cycle. As described above, the microcomputer 11 in the embodiment shown in FIG. 1 can control the velocity of the moving stage and thus the rotation of the motor in this manner.

I claim:

1. A stage driving system having an operation lever tiltable from its neutral position in all directions and being adapted to drive a stage in two-dimensional direction depending on the direction of the tilted operation lever, said system comprising:
   (a) means for detecting the angle of the tilted operation lever from its neutral position, said detecting means being adapted to generate a first signal when the angle of the tilted operation lever from its neutral position is between a first angle and a second angle larger than said first angle and to produce a second signal when the angle of the tilted operation lever from its neutral position is between said second angle and a third angle larger than said second angle; and
   (b) means for moving said stage in the two-dimensional direction, said moving means being adapted to move said stage at a velocity corresponding to the angle of the tilted operation lever in response to said first signal and to move said stage under a predetermined acceleration in response to said second signal.

2. A stage driving system as defined in claim 1, further comprising means for controlling the velocity provided by said first moving means relative to the angle of the tilted operation lever.

3. A stage driving system as defined in claim 1 wherein said first moving means is adapted to move said stage at a velocity proportionally increased from a predetermined velocity when the angle of the tilted operation lever is changed from said first angle to said second angle.

4. A stage driving system as defined in claim 1, further comprising means for changing the velocity of said moving stage provided by said first moving means to a predetermined velocity when said operation lever is in between said first angle and said second angle.

5. A system for controlling the rotation of a motor depending on the drive voltage applied thereto, said system comprising:
   (a) first generator means for generating a pulse;
   (b) second generator means for generating a pulse in response to a predetermined rotation in said motor;
   (c) means for counting the number of pulses from said first and second generator means, said counting means being adapted to generate a signal indicative of a difference between the number of pulses from said first generator means and the number of pulses from said second generator means;
   (d) means for forming a sawtooth pulse; and
   (e) means responsive to said sawtooth pulse to form said drive voltage, the last-mentioned means being adapted to control said drive voltage in accordance with the signal from said counting means.

6. A system as defined in claim 5, further comprising means for forming a reference pulse and wherein said first generator means is adapted to divide said reference pulse in frequency.

7. A system as defined in claim 5, further comprising means for forming a reference pulse and wherein said means for forming said sawtooth pulse is adapted to form said sawtooth pulse in response to said reference pulse.

8. A system as defined in claim 5 wherein said means for forming said drive voltage is adapted to amplify said drive voltage in accordance with the difference of the number of pulses indicated by said signal from said counting means.

9. A stage driving system having optical means providing a plurality of magnifications for observing an object on a stage and an operation lever tiltable from its neutral position in all the directions, said stage being moved in two-dimensional direction depending on the direction of the tilted operation lever, said system comprising:
   (a) means for detecting the angle of the tilted operation lever from its neutral position, said detecting means being adapted to generate a first detection output signal corresponding to the angle of the tilted operation lever from its neutral position;

(b) means responsive to said first detection signal to move said stage in two-dimensional plane at a velocity corresponding to the angle of the tilted operation lever;

(c) means for detecting the magnification of said optical means to generate a second detection signal; and (d) means responsive to said second detection signal to control the velocity of said moving stage provided by said moving means depending on the angle of the tilted operation angle.

10. A system for controlling the rotation of a motor in accordance with a drive voltage, said system comprising:

(a) first generator means for generating a pulse;

(b) second generator means for generating a pulse in accordance with a predetermined rotation in said motor;

(c) means for counting the number of pulses from said first and second generator means, said counting means being adapted to generate a digital output signal indicative of a difference between the number of pulses from said first generator means and the number of pulses from said second generator means;

(d) means for forming a sawtooth pulse; and (e) converter means for converting said digital signal into an analog signal which in turn is outputted as said drive voltage, said converter means being adapted to control said drive voltage in accordance with said sawtooth pulse.

* * * * *